UNITED STATES PATENT OFFICE.

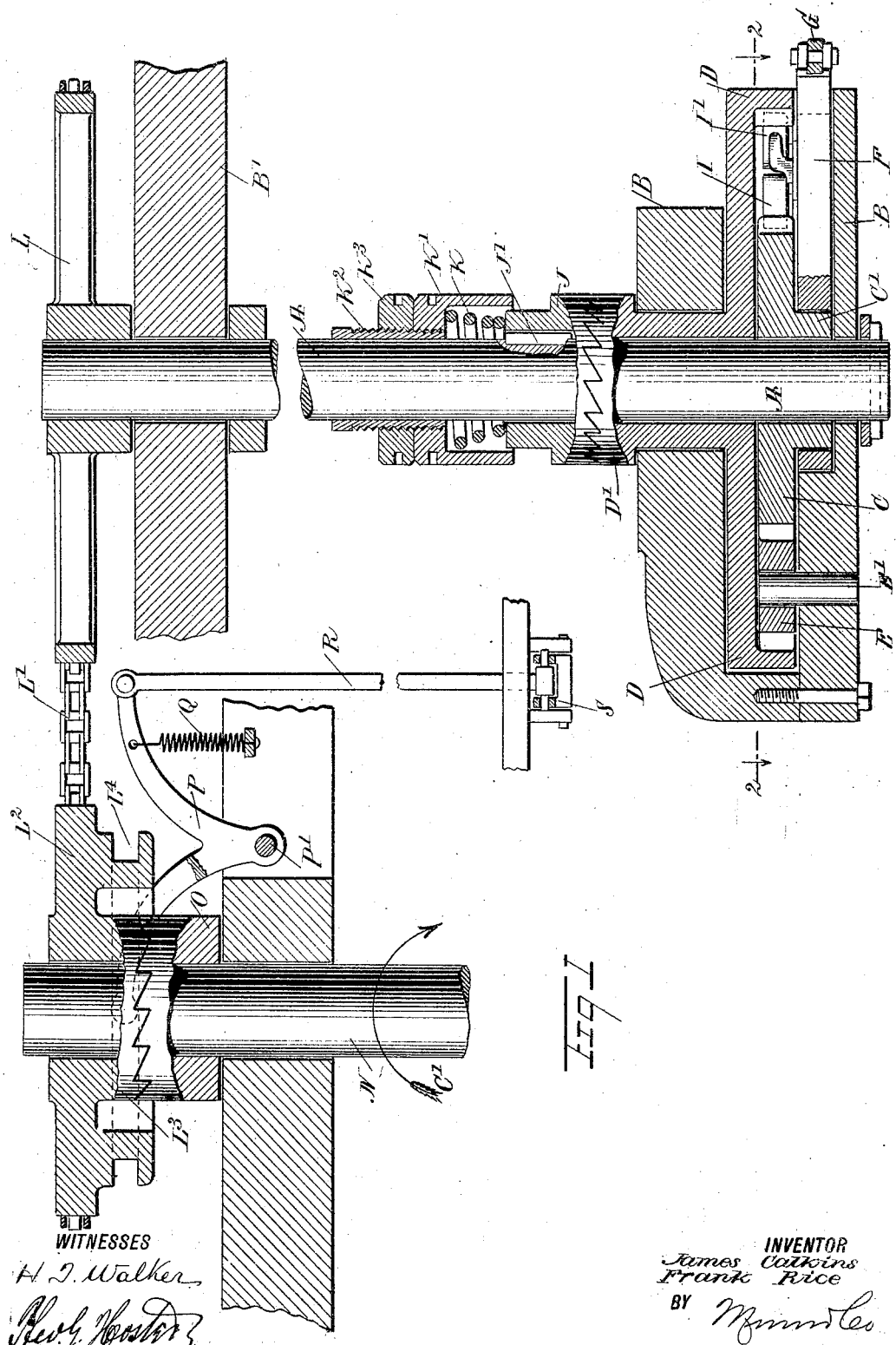

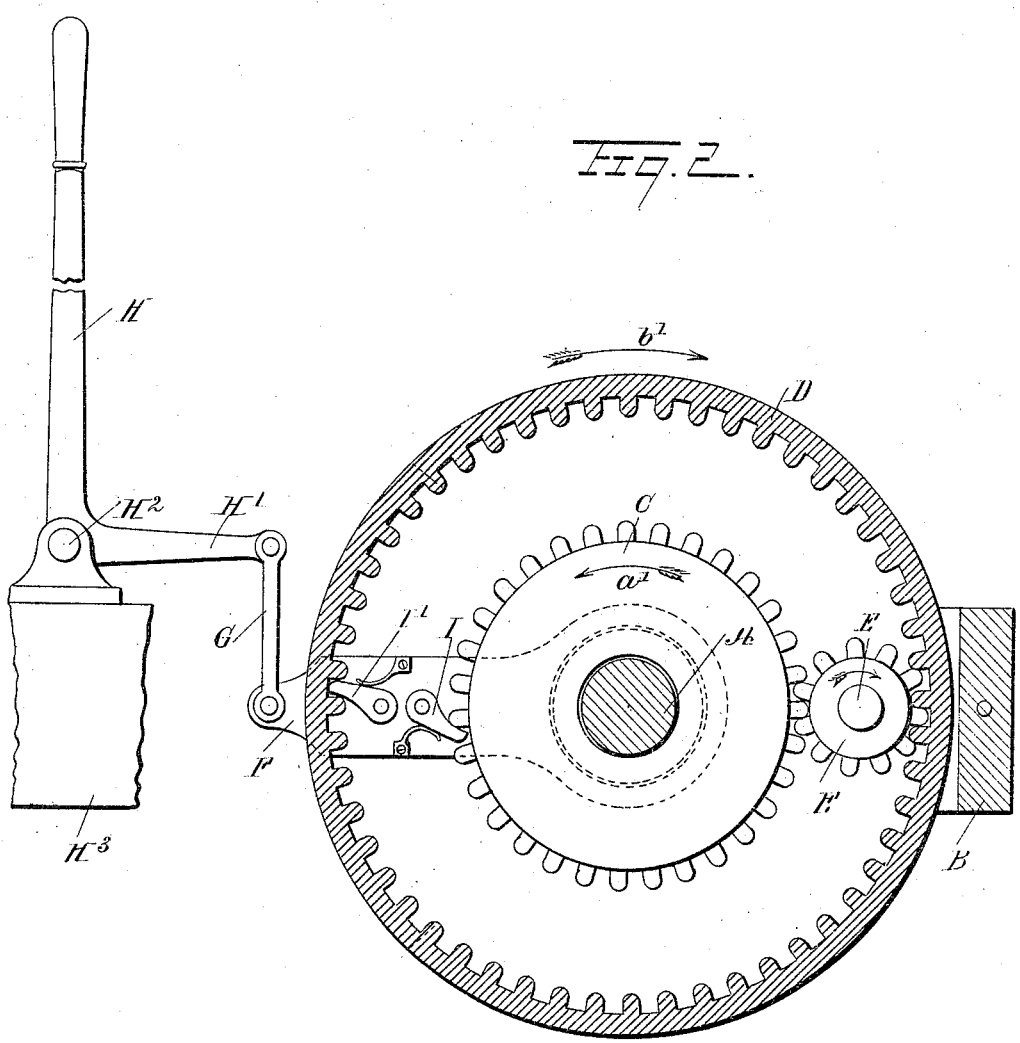

JAMES CALKINS AND FRANK RICE, OF PORT HURON, MICHIGAN.

INTERMITTENT-GRIP DEVICE.

1,039,023.

Specification of Letters Patent.   Patented Sept. 17, 1912.

Application filed June 1, 1911. Serial No. 630,567.

*To all whom it may concern:*

Be it known that we, JAMES CALKINS and FRANK RICE, both citizens of the United States, and residents of Port Huron, in the county of St. Clair and State of Michigan, have invented a new and Improved Intermittent-Grip Device, of which the following is a full, clear, and exact description.

The invention relates to an intermittent grip device forming part of a cranking or starting mechanism for internal combustion engines, such as are used on automobiles, motor boats, aeroplanes and other machines and devices.

The object of the invention is to provide a new and improved mechanism, which is simple and durable in construction, easily manipulated and arranged to quickly and positively turn the engine shaft without much physical exertion on the part of the operator or injury to the operator in case of back firing.

For the purpose mentioned, use is made of a manually-controlled lever, carrying spring-pressed pawls engaging concentric gear wheels geared together by an intermediate gear wheel, the concentric gear wheels being secured on a shaft, and a spring-pressed clutch mechanism connecting one of the said gear wheels with the said shaft, so that when the lever is actuated the said shaft is driven continually in one direction.

A practical embodiment of the invention is represented in the accompanying drawings forming a part of this specification, in which similar characters of reference indicate corresponding parts in all the views.

Figure 1 is a sectional plan view of the engine-starting mechanism connected with an engine shaft; Fig. 2 is a sectional elevation of the same on the line 2—2 of Fig. 1.

The shaft A to be driven is journaled in suitable bearings B and B' which may be attached to or form part of the frame of the engine, and on the said shaft A are loosely mounted a gear wheel C and an internal gear wheel D, connected with each other by an intermediate gear wheel E journaled on a stud E' attached to the bearing B. On the hub C' of the gear wheel C is fulcrumed an actuating lever F pivotally connected by a link G with an angular arm H' of a hand lever H under the control of the operator, and fulcrumed at H² on a suitable fixed support H³. On the actuating lever F are fulcrumed spring-pressed pawls I and I' in engagement with the teeth of the gear wheels C and D, so that when the operator imparts a forward and backward swinging motion to the hand lever H, then an up and down swinging motion is given to the actuating lever F. The gear wheel D is provided on its hub with a clutch member D' engaging a clutch member J fastened by a key J' to the shaft A, and mounted to slide lengthwise on the shaft A and against the tension of a spring K held in a cap K' screwing on a threaded sleeve K² mounted on the shaft A, the cap K' being held in place by a lock nut K³ screwing on the sleeve K². By the arrangement described the tension of the spring K can be adjusted to hold the clutch members J and D' in mesh during cranking, but to allow the said clutch members to separate in case of back fire.

From the foregoing it will be seen that by the arrangement described, the operator on imparting a swinging motion to the hand lever H causes a continuous rotary motion of the shaft A in the direction of the arrow *b'*. On the shaft A is secured a sprocket wheel L connected by a sprocket chain L' with a sprocket wheel L² mounted to rotate loosely on the engine shaft N and adapted to slide thereon in the direction of the said shaft. The hub of the sprocket wheel L² is provided with a clutch member L³ adapted to engage a corresponding clutch member O secured on the engine shaft N, and the said sprocket wheel L² is provided with an annular groove L⁴ engaged by a shifting lever P fulcrumed at P' on the engine frame and pressed on by a spring Q to normally hold the clutch member L³ out of engagement with the clutch member O. The shifting lever P is pivotally connected by a link R with a pedal S, under the control of the operator, to permit the latter to impart a swinging motion to the shifting lever P with a view to shift the sprocket wheel L² to engage the clutch member L³ with the clutch member O. Thus when the shaft A is rotated in the direction of the arrow *b'* by the operator manipulating the lever H, as previously explained, then a rotary motion is transmitted by the sprocket wheel L, chain L', sprocket wheel L², clutch members L³ and O to the engine shaft N to rotate the latter in the direction of the arrow *c'* with a view to start the engine. When the operator releases the pedal S then the spring Q acts on the shifting lever P so that the latter moves the sprocket wheel L² away from the clutch member O, thus disengaging the clutch member L³ from the clutch member O.

The engaging teeth of the clutch members D' and J are cut, as shown, to slant in both directions so that these clutch members may be forced to give way from one another, under tension of spring K, by relative movement in either direction. It will be readily seen that when the engine starts, in the direction of arrow c', clutch member O will slide freely over the clutch member L³. On the other hand, when the engine backfires in the direction inverse to arrow c', the pawls I and I' will lock the gears from revolution, and thus the clutch members D' and J will be forced to give way.

From the foregoing it will be seen that when the operator manipulates the lever H by hand and presses the treadle S with the foot, and back-firing takes place, then no injury is inflicted on the operator, as the engine-starting mechanism will remain dormant during the rotating of the engine shaft N in the inverse direction of the arrow c'. It is understood that the lever F may be extended and actuated directly without the lever H and link G.

Having thus described our invention, we claim as new and desire to secure by Letters Patent:

The combination of a shaft to be driven, a gear wheel on said shaft; an internally geared ring journaled on said shaft and extending around the said gear wheel; a second gear wheel connecting said first gear wheel and said geared ring, an operating lever, and pawls mounted on said lever in the space between said first gear wheel and said geared ring and engaging the same in relatively opposite directions.

In testimony whereof we have signed our names to this specification in the presence of two subscribing witnesses.

JAMES CALKINS.
FRANK RICE.

Witnesses:
ALBERT P. RYAN,
FRED B. BROWN.

---

Copies of this patent may be obtained for five cents each, by addressing the "Commissioner of Patents, Washington, D. C."